United States Patent [19]

Lamberti

[11] 4,389,843
[45] Jun. 28, 1983

[54] WATER WAVE ENERGY TRANSDUCER

[76] Inventor: John Lamberti, 1186 Broadway, New York, N.Y. 10001

[21] Appl. No.: 248,226

[22] Filed: Mar. 27, 1981

[51] Int. Cl.³ .............................................. F03B 13/12
[52] U.S. Cl. ........................................ 60/507; 60/505; 60/506; 74/812; 440/9; 290/42
[58] Field of Search ................. 60/500, 506, 505, 507, 60/501; 417/332; 74/141.5, 812, 810, 143; 290/42, 53; 440/9

[56] References Cited

U.S. PATENT DOCUMENTS

| 855,258 | 5/1907 | Neal | 417/332 |
|---|---|---|---|
| 891,597 | 6/1908 | Crater | 74/143 |
| 916,624 | 3/1909 | St. Mary | 74/812 |
| 938,750 | 11/1909 | Franklin | 60/325 |
| 1,540,364 | 6/1925 | Roldan | 60/505 |
| 2,048,339 | 7/1936 | Kalfas | 440/9 |
| 3,259,361 | 7/1966 | Cantu | 60/505 |
| 4,122,676 | 10/1978 | Kikat | 60/398 |

Primary Examiner—A. Michael Chambers
Attorney, Agent, or Firm—Robert E. Burns; Emmanuel J. Lobato; Bruce L. Adams

[57] ABSTRACT

A water wave energy transducer comprises a boat having pivoted arms projecting out over the water, a float being mounted on the outboard end of each arm so that the arms are oscillated by wave action on the floats. Drive sprockets fixed on the arms coaxially with their pivots are connected by drive chains with two driven sprockets coaxial, respectively, with two gears which mesh with one another and one of which meshes with an output gear. The driven sprockets are coupled with the coaxial gears by one-way clutches which are oppositely arranged so that one drives when the sprockets turn in one direction and the other drives when the sprockets turn in the opposite direction. Hence, the output gear is driven in the same direction by both upward and downward movement of the floats. The output gear is connected by a speed increasing gear train with an electric generator which can supply current to a motor for propelling the boat, or through a cable to the shore when the boat is anchored.

11 Claims, 3 Drawing Figures

WATER WAVE ENERGY TRANSDUCER

FIELD OF THE INVENTION

This invention relates to water wave energy transducers for converting wave motion of bodies of water such as oceans, seas, bays and lakes into unidirectional rotational motion suitable for driving a variety of mechanisms, for example, electric generators.

BACKGROUND OF THE INVENTION

Transducers for converting water motion into mechanical movement have heretofore been proposed in an attempt to make use of the extensive tidal and wave energies available along the shorelines of bodies of water. For example, U.S. Pat. No. 3,664,125 discloses an apparatus employing a float which is coupled to a mechanism that is driven as a result of upward and downward motion of the float. Such apparatus is actuated in response to the upward and downward movement of the water surface on which the float rides. The apparatus is thus actuated by tidal movement. However, it does not utilize other motions of the water in particular, wave motion except perhaps large waves or swells.

In my U.S. Pat. No. 4,184,336, there is disclosed a water wave energy transducer comprising a float which is guided in its up and down movement by anchored masts. A rack bar extending up through an opening in the float has its lower end pivotally fixed to the bottom of the body of water and engages gearing in the float so as to generate mechanical movement from motion of the float.

SUMMARY OF THE INVENTION

It is an object of the present invention to overcome the limitations and disadvantages of prior apparatus and in particular, to provide an improvement of the transducer disclosed in my U.S. Pat. No. 4,184,336.

In accordance with the invention, at least one and preferably a plurality of arms, are pivotally mounted on a support slightly above the surface of a body of water, for example, a boat. The arms extend out over the water and each has at its outboard end a float which is adapted to float on the water and is thus moved up and down by wave action so as to cause the arm to oscillate about its pivot. Such oscillatory movement of the arm or arms is converted into undirectional rotary movement which is utilized to perform useful work, for example, to drive an electric generator.

The mechanism for converting oscillatory movement of the arms into unidirectional rotary movement preferably includes first and second gears which mesh with one another and first and second chain sprockets which are coaxial with the respective gears. A drive chain couples the first and second sprockets so that they rotate in the same direction as one another. Moreover, each pair of sprockets is coupled with an arm, for example, by chain drive, so that oscillatory movement of the arm is imparted to the sprockets, thereby causing them to rotate first in one direction, and then in the other. Each of the sprockets of a pair is coupled with the respective gear by means of one-way drive means, the drive means of one sprocket being arranged oppositely to that of the other sprocket. Hence, one sprocket is coupled with the respective gear when the sprockets rotate in one direction and the other sprocket is coupled with the respective gear when the sprockets turn in the opposite direction. This results in the gears always being turned in the same direction regardless of the direction of rotation of the sprockets. Thus, oscillatory movement of the arm or arms is converted into unidirectional rotary movement utilized for performing useful work, for example, driving an electric generator.

BRIEF DESCRIPTION OF DRAWINGS

The object and advantages of the invention will be more fully understood from the following description of a preferred embodiment of the invention shown by way of example in the accompanying drawings in which.

DESCRIPTION OF PREFERRED EMBODIMENT

Figure 1:
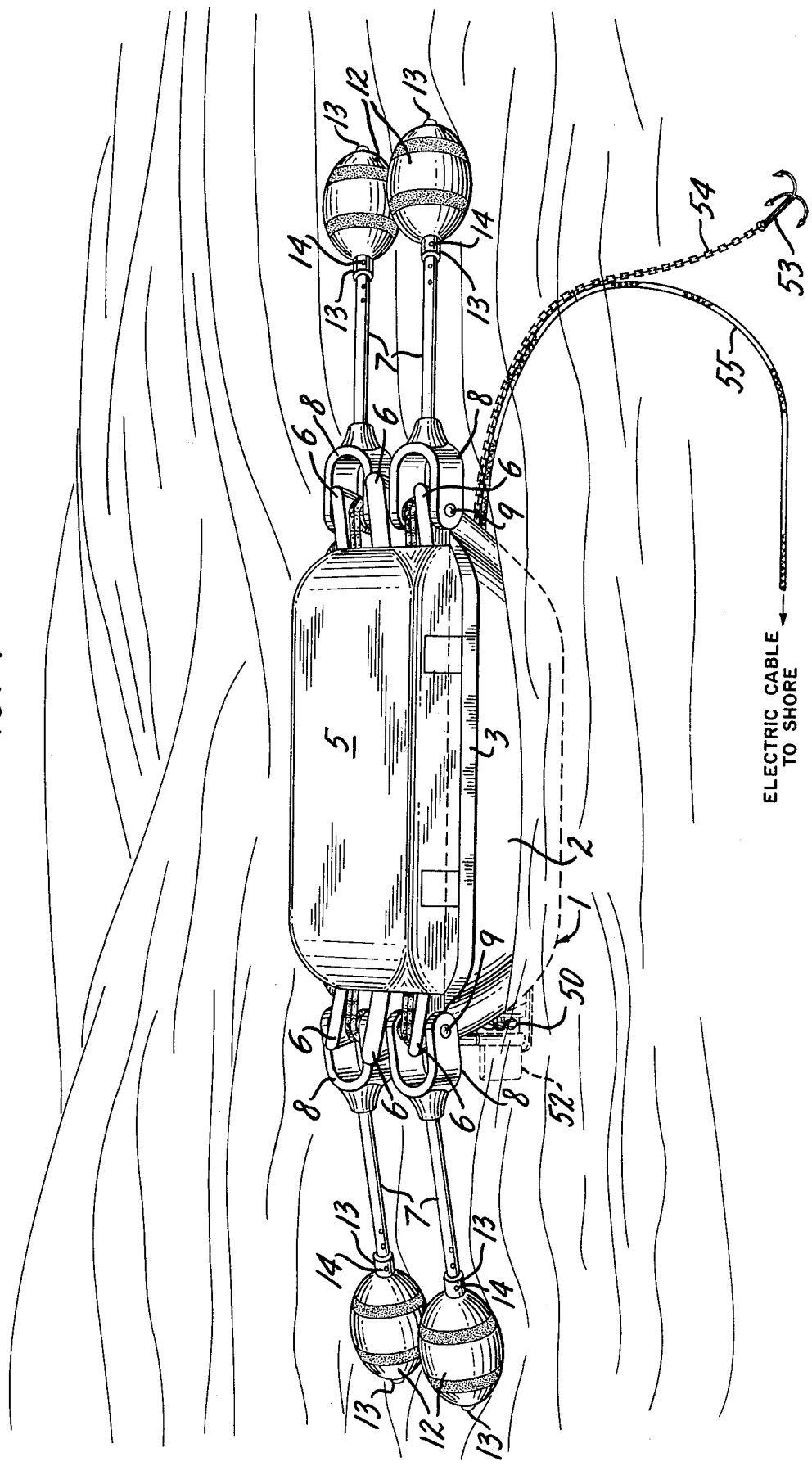
FIG. 1 is a schematic perspective view of a vessel in which a water wave energy transducer in accordance with the present invention is incorporated.

In the drawings, a water wave energy transducer in accordance with the present invention is shown by way of example incorporated in a marine vessel shown in the form of a boat 1 having a hull 2 with an upper deck 3 and lower deck 4. A cover 5 in the nature of a removable hatch cover protects transducer mechanism mounted in the vessel as will be presently described. Moreover, at its bow and stern the vessel has spaced, outwardly projecting portions or prongs 6 for supporting portions of the water wave energy transducer.

The transducer comprises a plurality of pivoted arms 7 which extend from the vessel out over the water. At its inboard end, each of the arms 7 is provided with a bifurcated fitting 8 which straddles one of the prongs 6 and is fixed to a shaft 9 rotatably supported by bearings 10 on two of the prongs 6. A float 12 is mounted at the outboard end of each arm 7 between two collars 13 which are slidable on the arm and secured by bolts or set screws 14. The position of the float on the arm and hence the effective length of the arm is thus adjustable. Each of the floats has a central tube through which the arm extends and is freely rotatable on the arm so that any current or wave action imparting rotary motion to the float does not apply torque to the arm. While two arms have been shown at each end of the vessel, it will be understood that the number of arms can be increased or decreased and that like arms may also extend from sides of the vessel. In some instances, for example, when the vessel is being propelled forwardly, it may be desirable to have arms and floats only at the stern and at both sides of the boat.

As the floats 12 float on the surface of the water, it will be understood that the floats will be moved up and down relative to the vessel by wave action and by any pitching or rolling of the vessel and that this will produce oscillatory movement of the arms 7 relative to the vessel. In accordance with the invention, this oscillatory movement of the arms is used to produce useful work.

Figure 2:
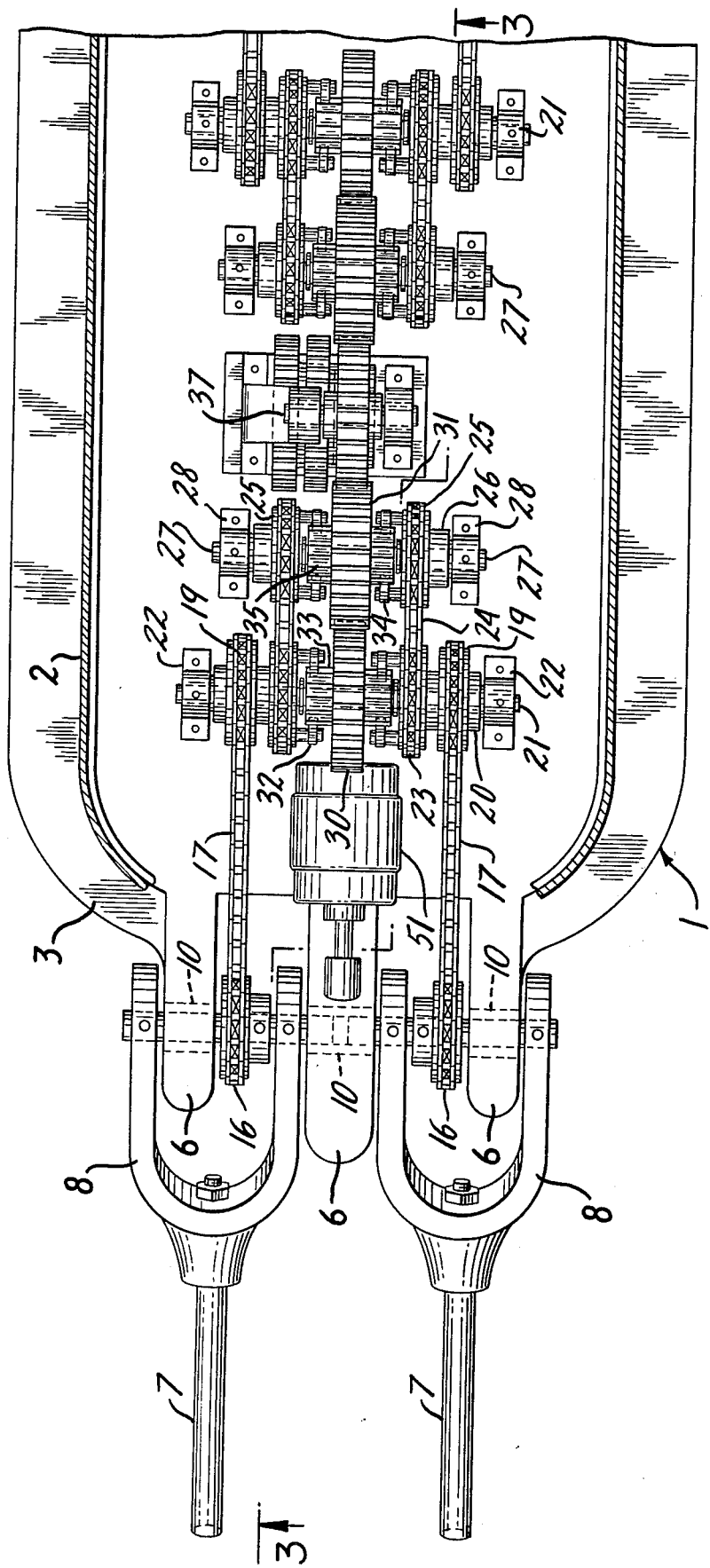
FIG. 2 is a plan view of a rear portion of the vessel with the cover broken away to show a central and rearward portion of the transducer of which the forward portion is a duplicate.
Figure 3:
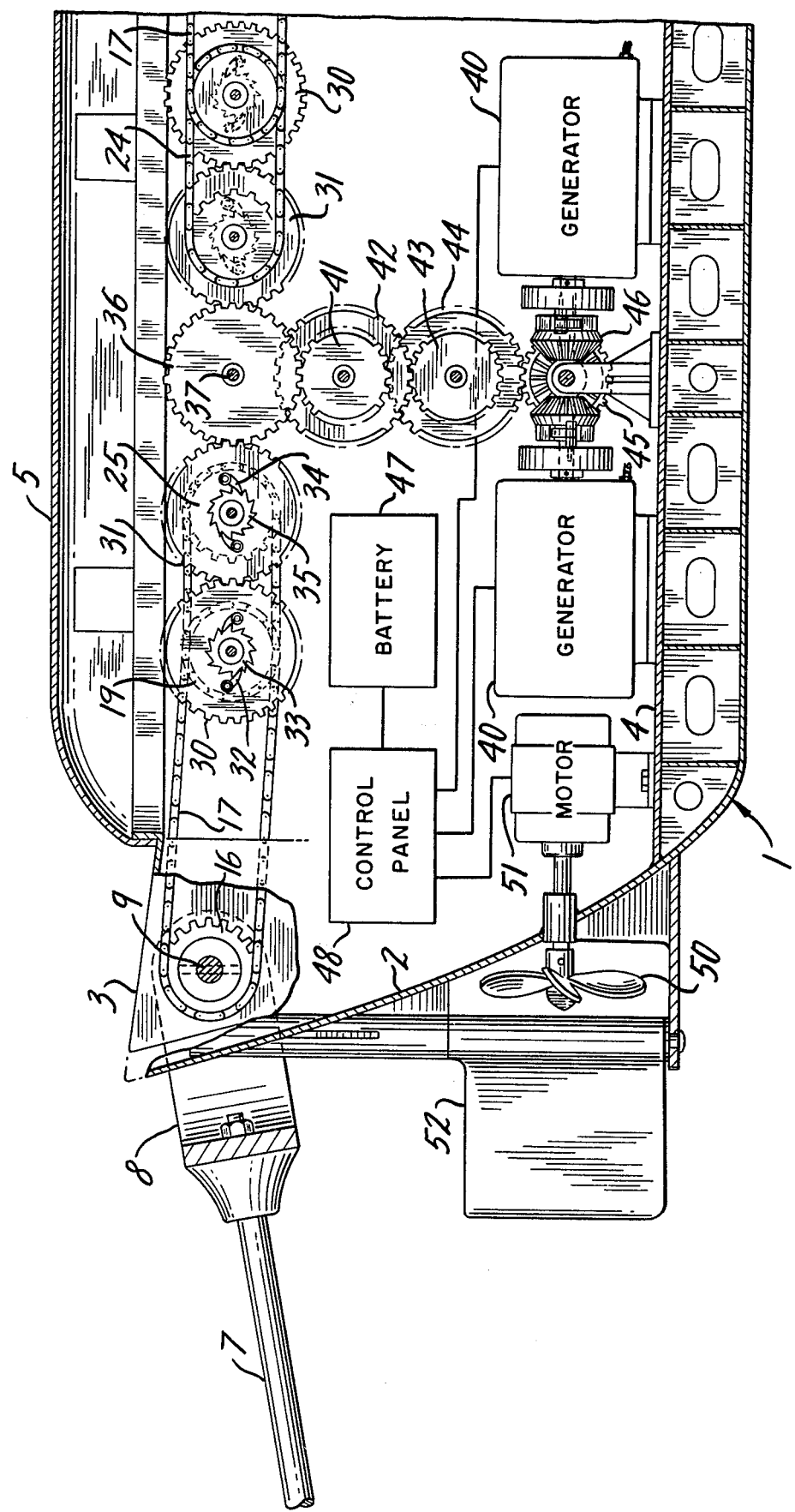
FIG. 3 is a schematic vertical section of a central and rear portion of the vessel, the forward portion of the transducer being a duplicate of the rearward portion shown.

As seen in FIGS. 2 and 3, a sprocket wheel 16 fixed on the shaft 9 of each of the arms 7 is coupled by a link chain 17 with a second sprocket 19 fixed on a sleeve 20 rotatable on a shaft 21 supported by fittings 22. While the sprockets 16 and 19 are shown by way of example as being of the same size, it will be understood that they can be of different sizes in order to obtain increase or decrease of speed. For example, if sprocket 16 is made larger than sprocket 19, an increase in angular speed will be obtained. A third sprocket 23 fixed on sleeve 20 is coupled by a link chain 24 with a fourth sprocket 25 fixed on a sleeve 26 rotatably supported by a shaft 27 mounted with fittings 28.

With the mechanism thus far described, it will be understood that oscillatory movement of each arm 7, produced by wave action on the respective float 12, is imparted to the sprocket 16 which is fixed on shaft 9 coaxial with the pivot of the arm, and is transmitted through link chains 17 and 24 to sprockets 19, 23, and 25. Moreover, by reason of the chain connections between them, all of the sprockets turn in the same direction at the same time. For example, if the float on the arm on the starboard side at the stern of the vessel is lifted by a wave, the sprocket 16 will be turned in a clockwise direction as viewed from the starboard side of the vessel and sprockets 19, 23, and 25 will likewise turn in a clockwise direction.

Means for converting oscillatory movement of the sprockets into unidirectional rotary movement, is shown as comprising two spur gears 30 and 31 which mesh with one another and are rotatable respectively on shafts 21 and 27. Gear 30 is coupled with sprocket 23 by means of a one-way clutch comprising pawls 32 pivotally mounted on the sprocket 23 and a ratchet 33 fixed to the gear 30. Gear 31 is similarly coupled with the sprocket 25 by a one-way clutch comprising pawls 34 pivotally mounted on the sprocket 25 and engaging a ratchet 35 fixed to gear 31. As seen in FIG. 3, the one-way clutch 32, 33 is operative in the opposite direction from the one-way clutch 34, 35. Thus when the sprockets rotate in a counterclockwise direction as viewed in FIG. 3, gear 30 is driven in a counterclockwise direction by the one-way clutch 32, 33 and drives gear 31 in a clockwise direction by reason of the gears meshing with one another. When the sprockets turn in a clockwise direction, gear 31 is driven in a clockwise direction by the one-way clutch 34, 35 and drives gear 30 in a counterclockwise direction. It will thus be seen that gear 30 is always driven in a counterclockwise direction and gear 31 is always driven in a clockwise direction irrespective of the direction in which the sprockets turn. Moreover, it will be seen that the mechanism is doubleacting in that the gears 30 and 31 are rotated by downward movement of the float and likewise by upward movement of the float. Thus, as viewed in FIG. 3, downward movement of the float on arm 7 results in the sprockets turning counterclockwise whereupon gear 30 is driven in a counterclockwise direction by the one-way clutch 32, 33 and drives gear 31 in a clockwise direction. When the float moves upwardly, the sprockets turn in a clockwise direction whereupon gear 31 is driven in a clockwise direction by the one-way clutch 34, 35 and drives gear 30 in a counterclockwise direction. Hence, oscillatory movement of the arms and of the sprockets results in unidirectional rotary movement of gears 31 and 32. The floats 10, while buoyant, are heavy enough to move the arms 7 downwardly when they are not supported by water so as to assure double action of the mechanism.

As seen from FIG. 2, each of the arms 7 at the stern of the vessel, is coupled with chain and sprocket mechanism as described above and each of the gears 30, 31 has a ratchet 33, 35 at each side so that the gears are driven by either or both float arms. Moreover, since the pawls and ratchets provide, in effect, over-running clutches, the gears 30, 31 will be driven by the float arm having the greater speed of angular movement, regardless of the direction of movement of the arm.

Moreover, in the embodiment shown by way of example in the drawings, the arms, floats, sprockets and gearing in the aft portion of the vessel are duplicated in the forward portion. The two gears 31 mesh with a central gear 36 which is rotatably supported by a shaft 37 and bearings 38. Since gears 31 rotate in a clockwise direction in the illustrated example, center gear 36 will rotate in a counterclockwise direction. It will be understood that gear 36 is driven by all of the float arms at both ends of the vessel, the drive at any moment being imparted by the float arm having the greatest angular rate of movement regardless of whether the movement is up or down. With four floats as illustrated, even moderate wave action will produce continuous unidirectional rotation of the center gear 36.

The center gear 36 is in effect, an output gear which can be used to drive any desired load. As illustrated by way of example in FIG. 3, the output gear 36 drives two electric generators 40 through a gear train comprising spur gears 41, 42, 43 and 44 and bevel gears 45 and 46. It will be understood that gear 42 is fixed to gear 41 and that gear 44 is fixed to gear 43. Since gears 41 and 43 are smaller than gears 36 and 42, respectively, and gear 45 is smaller than gear 44, there will be an increase in speed so that the generators are driven at a higher speed than output gear 36.

The generators 40—which are either DC generators or are provided with rectifiers—supply current to a storage battery 47 through a control panel 48. Moreover, the vessel is shown as being provided with a propeller 50 driven by a motor 51 to which power is applied from the generators 40 and/or battery 47 through a control panel 48. Steering of the vessel is provided by a rudder 52 controlled by suitable steering mechanism (not shown).

A water wave energy transducer in accordance with the present invention can thus be used to propel a vessel as described above. Alternatively, the vessel can be anchored near a shore in order to supply power for shore installations. Thus, as illustrated schematically in FIG. 1, the vessel can be moored by means of an anchor 53 and anchor chain 54 whereupon power from the generators 40 and/or battery 47 can be transmitted to shore installations by means of a cable 55. If the water wave energy transducer installation is intended only for supplying power to installations on the shore, the vessel can be permanently anchored and hence, need not be provided with a propeller, drive or rudder. In this event, the vessel may advantageously be in the form of a relatively simple barge providing a suitable support for the transducer.

While a preferred embodiment of the invention has been illustrated by way of example in the drawings, and is herein particularly described, it will be understood that many modifications can be made and hence, that the invention is in no way limited to the illustrated embodiments.

What I claim is:

1. A water wave energy transducer comprising a floating vessel having a bow and a stern, a set of three laterally spaced forwardly extending support means at the bow of said vessel and a set of three laterally spaced rearwardly extending support means at the stern of said vessel, each of said sets comprising a port side support, a central support, and a starboard side support, a first shaft extending between and rotatably supported by said port side support and said central support, a second shaft extending between and rotatably supported by said starboard side support and said central support, said first and second shafts being aligned but independently rotatable, a bifurcated fitting fixed on each of said shafts, an arm having an inboard end fixed to each of said bifurcated fittings and having a float on its outboard end, said arms at the stern of the vessel extending rearwardly and said arms at the bow of the vessel extending forwardly, a drive gear rotatably mounted in said vessel, and power transmitting means coupling said shafts with said drive gear, said power transmitting means including means for converting independent oscillatory movement of said shafts produced by rising and falling of said floats and pitching and/or rolling of said vessel into undirectional rotary motion of said drive gear.

2. A water wave energy transducer according to claim 1, in which said floats are rotatable on said arms.

3. The water wave transducer according to claim 2, in which said floats are movable lengthwise of said arms and are provided with means for securing said floats in selected positions longitudinally of said arms.

4. A water wave energy transducer according to claim 1, in which each of said bifurcated fittings straddles one of said supports supporting the shaft on which said fitting is fixed.

5. A water wave energy transducer according to claim 1, in which said power transmitting means comprises a sprocket fixed on each of said shafts, and in which said bifurcated fitting on the respective shaft straddles said sprocket.

6. A water and wave energy transducer according to claim 1, in which said coupling means for the shafts at each end of said vessel comprises first and second sprockets fixed respectively on said first and second shafts, first and second gears meshing with one another and rotatably supported in said vessel in a vertical plane passing between said first and second sprockets, independently rotatably third and fourth sprockets coaxial with and on opposite sides of said first gear, first and second chain means coupling said third and fourth sprockets with said first and second sprockets respectively, fifth and sixth sprockets coaxial with and fixed to said third and fourth sprockets respectively, independently rotatable seventh and eighth sprockets coaxial with and on opposite sides of said second gear, third and fourth chain means coupling said seventh and eighth sprockets with said fifth and sixth sprockets respectively, one-way drive means for coupling said third and fourth sprockets with said first gear when rotating in one direction, and one-way drive means for coupling said seventh and eighth sprockets with said second gear when rotating in the opposite direction.

7. A water wave energy transducer according to claim 6, in which each of said one-way drive means comprises a rachet wheel and a plurality of pawls engaging said rachet wheel.

8. A water wave energy transducer according to claim 6, in which said drive gear is a center gear meshing with said second gear of said coupling means for the floats at the bow of said vessel and with said second gear of said coupling means for the floats at the stern of the vessel.

9. A water wave energy transducer according to claim 8, further comprising an electric generator mounted in said vessel and speed-increasing gear means coupling said center gear with said generator to drive said generator.

10. A water wave energy transducer according to claim 9 further comprising a storage battery in said vessel, an electric motor driving a propeller for propelling said vessel and control circuit means interconnecting said generator, said battery and said motor.

11. A water wave energy transducer according to claim 1, in which said floats are of spheroidal shape with a longer axis extending longitudinally of the respective arms on which said floats are mounted.

* * * * *